United States Patent [19]

Baltzer et al.

[11] Patent Number: 4,875,916

[45] Date of Patent: Oct. 24, 1989

[54] METHODS OF ADJUSTING THE CONFIGURATION OF OPTICAL SUBSTRATES

[75] Inventors: Gary L. Baltzer; Brian Lynch, both of Norcross; William D. O'Brien, Jr., Lilburn, all of Ga.

[73] Assignee: American Telephone and Telegraph Company, AT&T Technologies, Inc., Berkeley Heights, N.J.

[21] Appl. No.: 247,984

[22] Filed: Sep. 22, 1988

Related U.S. Application Data

[63] Continuation of Ser. No. 928,436, Nov. 7, 1986, abandoned.

[51] Int. Cl.⁴ .................. C03B 37/025; C03B 37/012
[52] U.S. Cl. .................................... 65/2; 65/29;
       65/102; 65/109; 65/271; 65/278; 65/279
[58] Field of Search ............... 65/2, 29, 13, 271, 102,
       65/3.11, 3.12, 12, 109, 278, 279, 280, 281, 292

[56] References Cited

U.S. PATENT DOCUMENTS

| | | | |
|---|---|---|---|
| 1,756,293 | 4/1930 | Kremnec | 65/281 |
| 2,735,230 | 2/1956 | Morrill | 65/109 |
| 3,773,490 | 11/1973 | Inns | 65/280 |
| 3,897,233 | 7/1975 | Szilagyi | 65/109 |
| 4,165,222 | 8/1979 | DePanafieu | 65/2 |
| 4,194,807 | 3/1980 | Gliemeroth | 65/3.2 |
| 4,249,924 | 2/1981 | DePanafieu | 65/2 |
| 4,345,930 | 8/1982 | Basola | 65/2 |
| 4,477,273 | 10/1984 | Lynch | 65/3.12 |
| 4,486,214 | 12/1984 | Lynch | 65/13 |

Primary Examiner—Kenneth M. Schor
Attorney, Agent, or Firm—E. W. Somers

[57] ABSTRACT

In order to provide a substrate such as an optical preform rod (24) which is suitable for insertion into a tube and which has a transverse cross section that is substantially circular and disposed concentrically about a longitudinal axis of the substrate substantially along its entire length, a force-applying means such as a graphite roller (52) is adapted to be moved incrementally toward an axis of rotation (35) about which the preform rod is turned rotatably. Movement is discontinued when there is an indication that the force-applying means has been in continuous engagement with the preform rod for at least a predetermined portion of the periphery of the rod. In a preferred embodiment, the engagement of the force-applying means and the preform rod is discontinued after a predetermined time whereafter the force-applying means again is moved toward the axis of rotation. Cycles of engagement and disengagement are continued as relative motion is caused between the force-applying means and the preform rod in a direction along the axis of rotation.

7 Claims, 5 Drawing Sheets

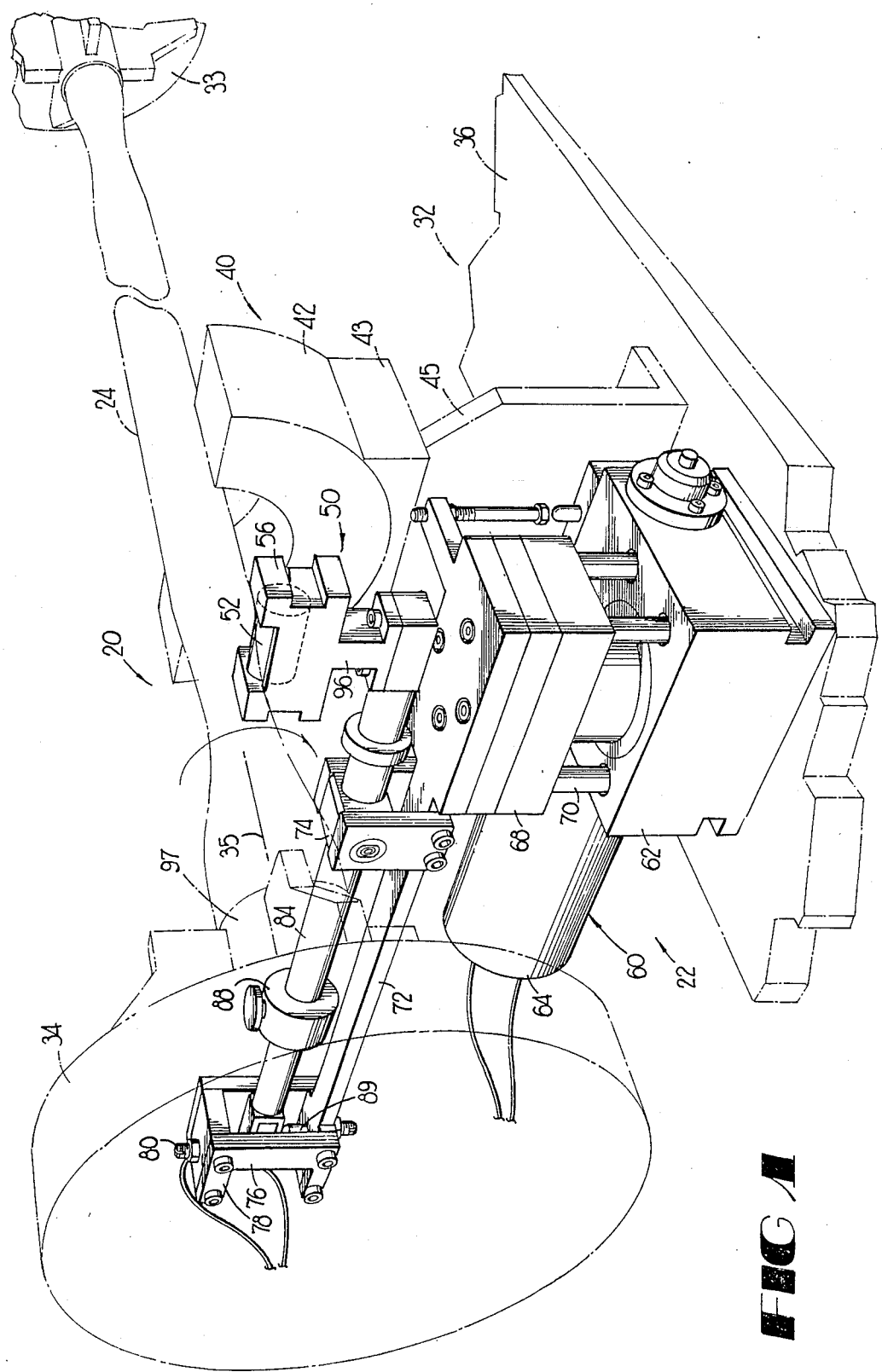

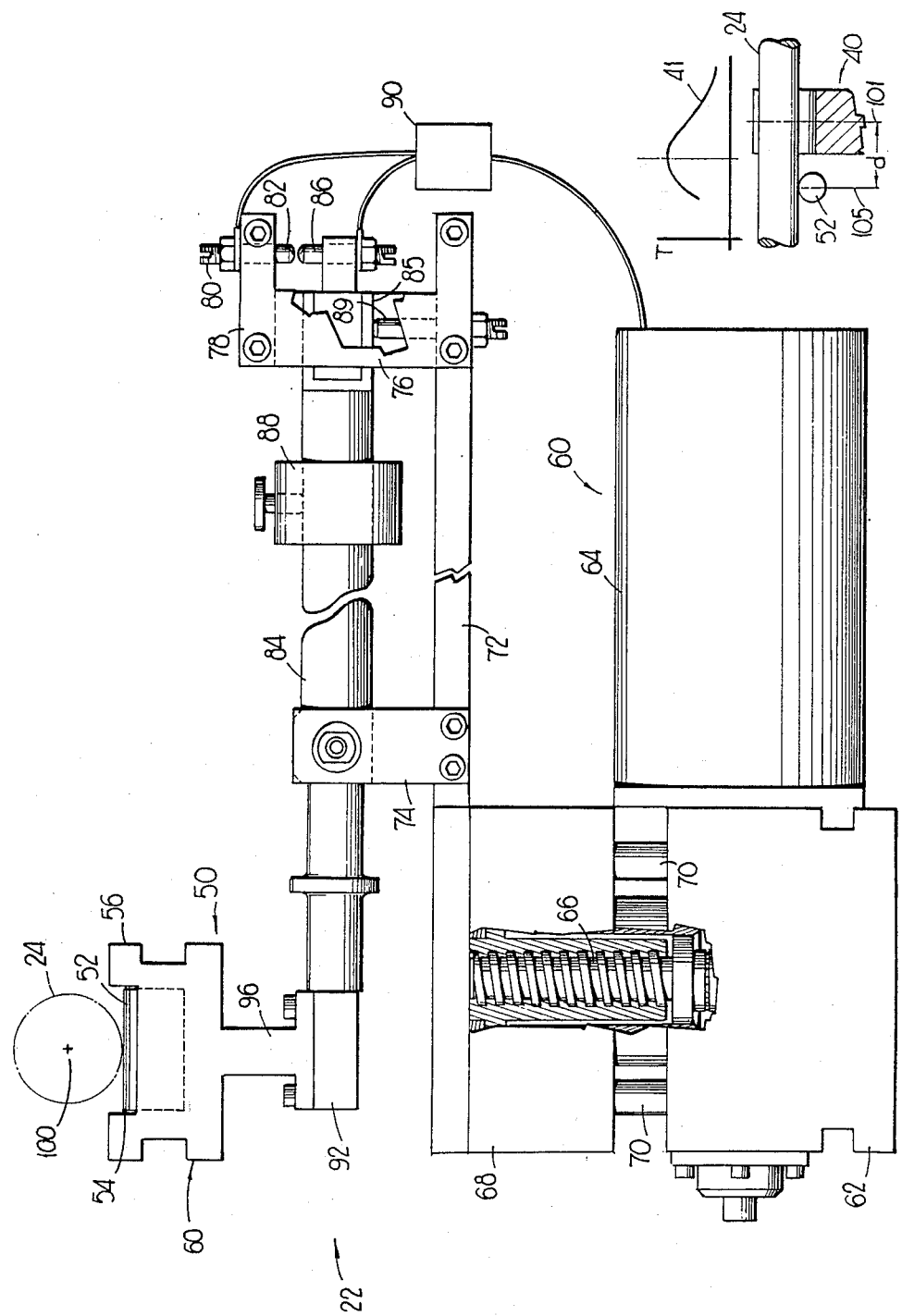

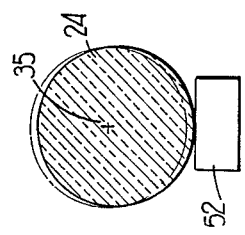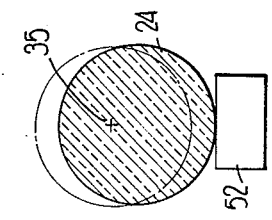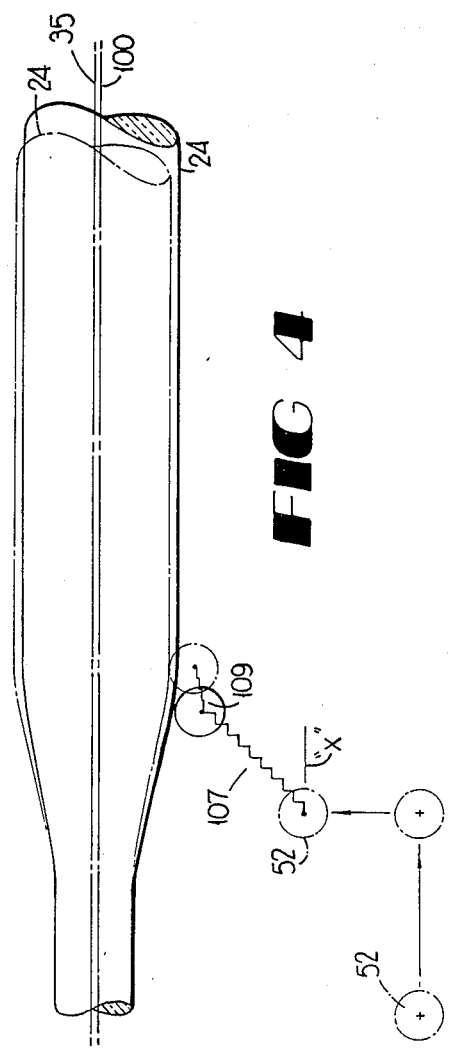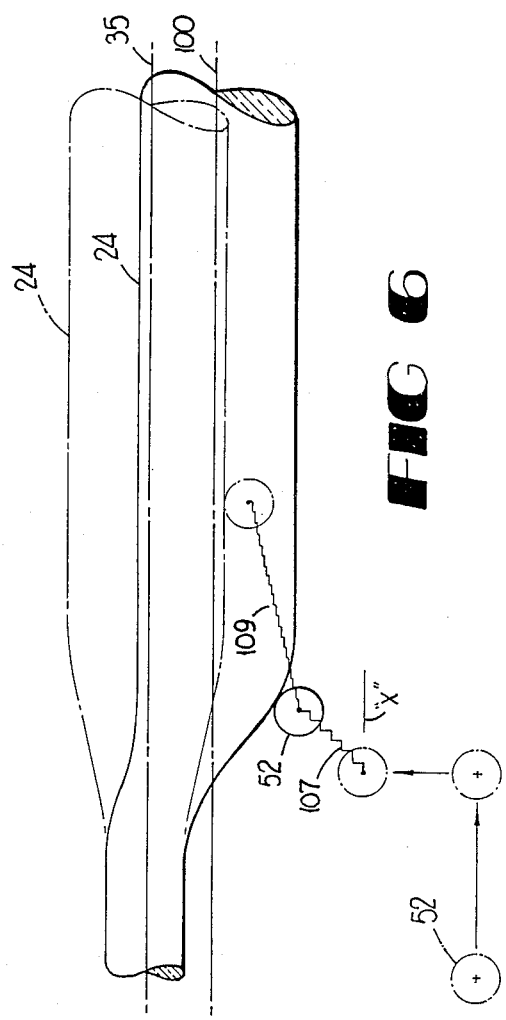

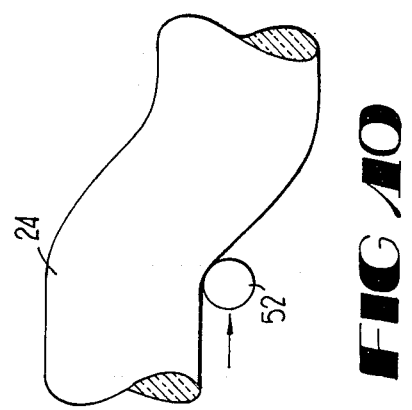
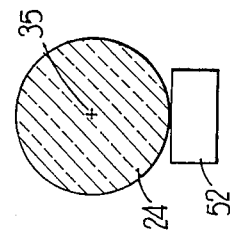
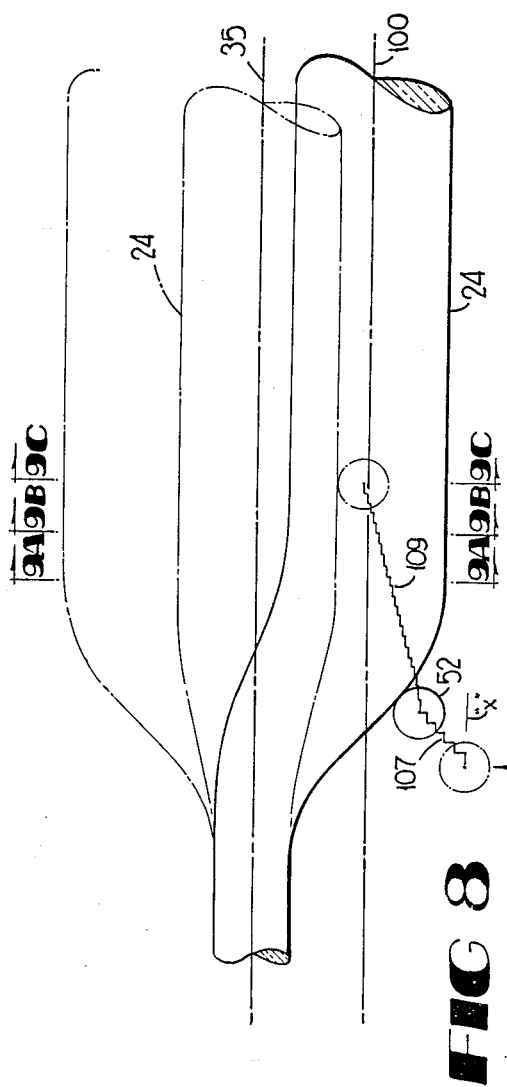
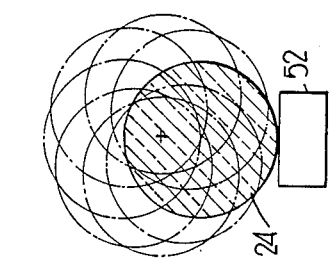
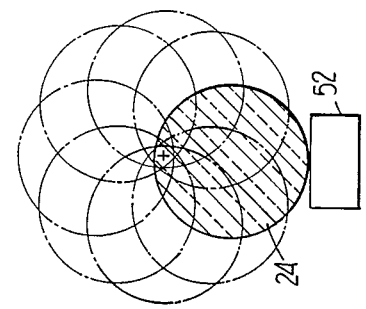
FIG 10
FIG 9C
FIG 9B
FIG 8
FIG 9A

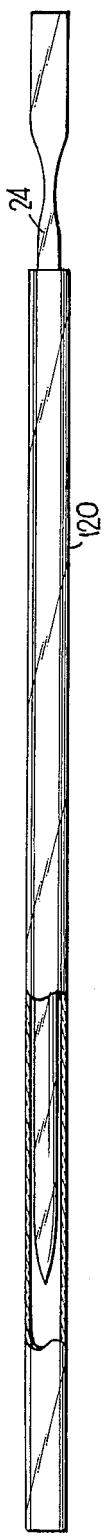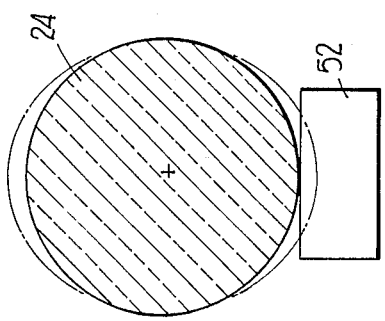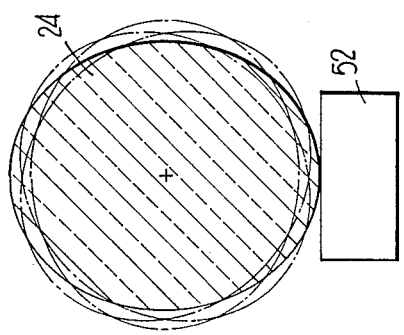
FIG. 13
FIG. 12
FIG. 11

METHODS OF ADJUSTING THE CONFIGURATION OF OPTICAL SUBSTRATES

This is a continuation of application Ser. No. 928,436 filed Nov. 7, 1986, now abandoned.

TECHNICAL FIELD

This invention relates to methods for adjusting the configuration of optical preforms. More particularly, it relates to methods for causing a preform rod which is used in a rod and tube process for providing optical preforms to have a predetermined configuration along the length of the preform rod.

BACKGROUND INFORMATION

Optical fiber of the type used in communications is fabricated typically by heating and drawing a portion of an optical preform comprising a refractive core surrounded by a protective glass cladding. Presently, there are several known processes for fabricating preforms. The modified chemical vapor deposition (MCVD) process, which is described in U.S. Pat. No. 4,217,027 issued in the names of J. B. MacChesney, et al. on Aug. 12, 1980 and assigned to Bell Laboratories, Inc., has been found most useful because the process enables large scale production of preforms which yield very low loss optical fiber.

During the fabrication of preforms by the MCVD process, precursor, reactant-containing gases, such as SiCl and GeCl, are passed through a rotating substrate tube which is made of silica glass. A torch heats the tube from the outside as the precursor gases are passed therethrough, causing deposition of submicron-sized glass particles on the inside surface of the tube. The torch is moved along the longitudinal axis of the tube in a plurality of passes to build up layer upon layer of glass to provide a preform tube. Once a sufficient number of layers have been deposited, the preform tube is then heated to cause it to be collapsed to yield a preform or preform rod as it is often called.

Increased demand for optical fiber has prompted efforts to increase the productivity of the MCVD process. However, the MCVD process rate is limited by the thickness of the wall of the substrate tube. To obtain optical fiber having optimal geometrical and optical characteristics, the preform must have a core-to-cladding mass ratio within specified limits. Increasing the mass of the substrate tube to obtain a larger preform requires that the wall of the substrate tube be made thicker. However, increasing the thickness of the wall of the substrate tube reduces the rate of heat transfer to the reactant-containing gases, thereby increasing the time required to deposit each layer of glass particulates. If the wall of the substrate tube is too thick, then insufficient heat transfer may occur, which may result in the formation of bubbles or incomplete sintering.

One way in which the productivity of the MCVD process can be increased is first to produce an undercladded preform, having a larger than desired core-to-cladding mass ratio. This preform is inserted into a glass tube which is referred to as an overcladding tube and which is then collapsed onto the preform. This is referred to as the rod and tube technique. It is desirable that any added eccentricity of material about the preform core due to overcladding should be minimized.

If the undercladding is not substantially straight, difficulties are encountered when the rod is inserted into the tube. This also may lead to problems when the tube is collapsed on the rod. Contact of the preform with the inside surface of the tube has not been found to be detrimental for present proof test levels of interest. However, radial misalignment between the overcladding tube and the undercladded preform should be minimized, otherwise the resultant drawn fiber core may be too eccentric which inhibits proper splicing of the drawn fiber to another.

Optical fiber preform tube straightening is not new. For example, in U. S. Pat. No. 4,477,273, methods and apparatus are used for straightening and configuring an optical preform tube. A graphite roller which is mounted on a carriage that supports a torch is moved manually into engagement with the preform tube at one end thereof and then moved along the tube with the torch during a collapse mode. However, the manual movement of a roller into engagement with a preform rod may be excessive and it may become embedded in the rod to such an extent that as it is moved with the torch it could be urged against a mass of the preform rod and cause damage thereto.

What is needed and what does not appear to be available in the prior art are automatic methods and apparatus for causing a preform rod to be substantially straight so that it is suitable for trouble-free insertion into a tube in a rod and tube process. The sought-after methods and apparatus desirably should be adaptable to existing apparatus and be controllable for a variety of conditions.

SUMMARY OF THE INVENTION

The foregoing problems of the prior art have been overcome by the methods of this invention. An elongated substrate which is made of a glass material and which is to be used as a source for an optical fiber is supported for rotation about an axis of rotation which extends through end portions thereof. Then the substrate is caused to be turned rotatably about the axis of rotation. Force-applying means is caused to be moved toward the substrate while it is being moved in a direction along the axis of rotation and while the substrate is being rotated until the substrate and the force-applying means engage each other. A signal is provided when the force-applying means has remained in engagement continuously with a predetermined portion of the periphery of the rotating substrate. In response to the signal, the incremental movement of the force-applying means toward the axis of rotation is discontinued.

Should the substrate not be circular, or should its cross section be offset from the axis of rotation through the end portions of the substrate, then as it rotates, a portion of it adjacent to the force-applying means will be spaced more closely to the axis of rotation causing disengagement of the force-applying means and the substrate and allowing the force-applying means to be moved further incrementally toward the longitudinal axis. This disengagement of the force-applying means causes the generation of the signal to be discontinued.

Each successive section of the substrate is determined to be acceptable when the generation of the signal is maintained for a predetermined time which equates to the continuous engagement of the force-applying means with a predetermined portion of the periphery of the substrate as the substrate is being rotated. As a result of this process, the substrate is caused to have a longitudinal axis which is substantially straight along its length and which is substantially coincident with the axis of rotation and a substantially circular cross section which is disposed concentrically about the longitudinal axis.

An apparatus for causing a substrate of optical quality glass material to be substantially straight and substantially circular includes facilities for suspending the substrate for rotation about an axis of rotation through end portions of the substrate and means for applying forces to each successive increment of length of the substrate. The force-applying means is supported so that it can be moved incrementally in a first direction toward the axis of rotation of the substrate and so that normally it is biased in the first direction. Also, facilities cause the force-applying means to be moved in a direction along the axis of rotation while it is being moved incrementally toward the axis of rotation. Signal generation means is biased normally in a second direction opposite to the first direction.

In operation, the force-applying means is moved incrementally toward the axis of rotation of the substrate until a portion of the rotating substrate and the force-applying means are in engagement with each other. This causes the signal generation means to be moved in the first direction and provide a signal to control facilities operably connected to the force-applying means. The signal continues as long as the force-applying means is held in suitable engagement with the substrate. During rotation, if any portion of the circumference of a length of the substrate is oval-shaped or if the cross-section of the substrate is offset from the axis of rotation through the end portions of the substrate, the force-applying means may become disengaged therefrom and be biased toward the axis of rotation causing the operation of signals to be discontinued. Each portion of length of the substrate is determined to be acceptably straight and circular when the generation of signals continues for at least a predetermined time. When this condition is met, the control facilities discontinue the incremental movement of the force-applying means toward the axis of rotation. The predetermined time is chosen to equate to the engagement of the force-applying means with the substrate for a predetermined portion of the periphery of the substrate during each excursion of the force-applying means toward the substrate.

In a preferred embodiment, the methods of this invention are used to straighten and to configure an optical quality glass preform rod after deposition of glass-forming materials has occurred inside a tube and after the tube has been collapsed into the rod. However, the methods may be used in other ways, such as for example, during the entire collapse mode. In this way, in each pass during collapse, the straightness and circularity of the resulting preform rod is controlled.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of an apparatus for providing an optical preform rod and for carrying out the principles of the methods of this invention;

FIG. 2 is a view of a portion of a torch assembly, a portion of a straightening and configuring device and a temperature profile across a zone of heat which is caused to traverse a preform rod;

FIG. 3 is an elevational view of a portion of the apparatus of FIG. 1 which is used to reconfigure an optical preform rod;

FIG. 4 is a schematic view of a preform rod of one configuration during reconfiguring with a straightening and configuring device in the form of a roller;

FIG. 5 is an end view of the prefom rod of FIG. 4 as it is being rotated;

FIG. 6 is a schematic view of a preform rod having an expected amount of offset during reconfiguring with the roller;

FIG. 7 is an end view of the preform rod of FIG. 7 as it is being rotated;

FIG. 8 is a schematic view of still another preform rod having a substantial offset;

FIGS. 9A, 9B and 9C are end views of the rod of FIG. 8 at different locations along its length;

FIG. 10 is an exaggerated side elevational view of the roller in engagement with a portion of a preform rod having a substantial offset;

FIGS. 11 and 12 are end views of a preform rod having an oval-shaped configuration and of the preform rod after it has been adjusted; and FIG. 13 is a view of a preform rod, the configuration of which has been adjusted in accordance with the methods of this invention, inserted into an overcladding tube.

DETAILED DESCRIPTION

Referring now to FIG. 1, there is shown an apparatus which is designated generally by the number 20 which includes straightening and configuring apparatus 22 which is used to cause an elongated glass substrate such as a preform rod 24 having particular optical properties to have predetermined geometrical characteristics. Those characteristics are that it will have a substantially straight longitudinal axis, and a transverse cross section at each point along the longitudinal axis which is substantially circular and which is disposed concentrically about the longitudinal axis.

The apparatus 20 also includes apparatus for heating a glass substrate tube (not shown) to provide the glass preform rod 24 from which are drawn lightguide fibers. The heating of the tube is required in order to cause the reaction products of gases and/or dopants being fed into the tube to be fused to the inside wall of the tube to provide an optically suitable profile for communications use. See priorly identified U.S. Pat. No. 4,271,027. The heating of the glass tube is carried out while gas phase reactants are delivered to the tube. A system for this delivery is disclosed in U.S. Pat. No. 4,276,243 which issued on Jun. 30, 1981, in the name of F. P. Partus.

The apparatus 20 generally includes a lathe 32 having a headstock 33 and a tailstock 34 each of which is driven off a common shaft (not shown) and which are used to support rotatably end portions of a glass starting tube for rotation about an axis 35 which extends through spindles (not shown) of the lathe. End portions of the glass tube are held in the spindles of the lathe 32. The lathe 32 also includes a carriage 36 which is mounted for reciprocal movement along the lathe between the headstock 33 and the tailstock 34. Mounted on the carriage 36 is a torch assembly, which is designated generally by the numeral 40, and the straightening and configuring apparatus 22. The torch assembly 40 is adapted to cause a flow of combustible gases to produce flames which are directed toward the glass tube. By confining the heat from the burning gases to a desired surface area of the tube, the torch assembly 40 establishes a zone of heat 41 (see FIG. 2) having a temperature profile at the surface of the tube. The mounting of the torch assembly 40 on the carriage 36 and its movement relative to the glass tube causes the zone of heat to be moved along the length of the tube.

A description of an oxy-hydrogen torch assembly suitable for use with the apparatus 20 is provided in U.S. Pat. No. 4,231,777 which issued on Nov. 4, 1980 in the names of B. Lynch and F. P. Partus. Another torch assembly is disclosed in U.S. Pat. No. 4,477,244 which issued on Oct. 16, 1984 in the names of J. R. Nis and C. R. Spainhour. The torch assembly 40 includes a housing 42 supported by a bracket 43 which is supported from a post 45 that is mounted on the carriage 36.

The mounting of the torch assembly 40 for movement relative to the centerline of the lathe 32 which extends between the headstock 33 and the tailstock 34 provides for a predetermined confinement of the substrate tube. The confinement of the tube is of help in the control of the temperature profile along successive portions of the glass tube as the torch assembly is moved reciprocally along the length of the rotating tube during a deposition mode.

After the substrate tube has experienced the deposition mode, it is collapsed into a solid rod. This may be accomplished by reducing the rotational speed from about 75 rpm to about 20 rpm and by increasing the temperature of the hot zone to about 1800° C. For one-half of the collapse mode, each pass is from right to left as viewed in FIG. 1. Then the tube is pinched off near the tailstock 34 and additional collapse passes from left to right are used.

Going now to the preform tube straightening and configuring apparatus 22, it is seen from FIGS. 1 and 3 that a force-applying means in the form of a contact device 50 is positioned adjacent to the torch assembly 40. In a preferred embodiment, the contact device 50 includes a roller 52 which is made of graphite. The roller 52 is mounted in a fixed position in bearings 54—54 that are supported in a housing 56. The contact device may take other forms such as for example, a metallic tube. Advantageously, the roller may be turned in the bearings to other orientations after wear occurs in any one position.

The roller 52 is mounted in an apparatus designated generally by the numeral 60 which is supported on the lathe carriage. As can best be seen in FIG. 3, the apparatus includes a 90° gearbox 62 which is driven by a stepper motor 64. Extending from the gearbox 62 is a drive screw 66 which has an upper end that mates with an internally threaded screw member mounted in a platform 68. Movement of the platform 68 is guided by four rods 70—70 which are connected to an underside of the platform 68 and which are mounted for reciprocal movement within bores in the gearbox.

Attached to the platform 68 is a cantilevered base 72 having a fulcrum 74 attached thereto and a U-shaped end portion 76. Mounted in an upper portion 78 of the U-shaped end portion 76 of the base and insulated therefrom is a first electrical contact 80. The electrical contact 80 includes a depending portion 82 which extends toward the cantilevered base 72.

Mounted pivotally on the fulcrum 74 is an arm 84. At one end portion 85 of the arm 84 is mounted a second electrical contact 86 which extends toward the first electrical contact 80 and which is insulated from the arm 84. The upper end of the second electrical contact 86 is spaced about 0.018 cm from the lower end of the upper contact 80.

A counterweight 88 is adjustably positioned on the arm 84 between the fulcrum 74 and the second electrical contact 86. In a preferred embodiment, the distance from the end of the end portion 85 of the arm to the center of the fulcrum is about twice the distance from the center of the fulcrum to the opposite end of the arm. The counterweight 88 causes the end portion 85 of the arm to be biased normally in a downward direction as viewed in FIG. 3. Downward movement of the end portion of the arm 84 is controlled by an adjustable stop 89 having an upper end which engages an underside of the arm 84.

At an opposite end portion 92 of the arm 84 is mounted a cradle 96. The cradle 96 is adapted to support rotatably the housing 56 in which is mounted the roller 52. As seen in FIG. 3, the cradle 96 is positioned on the arm 84 so that a transverse centerline of the roller is aligned with a longitudinal axis 100 of the preform rod 24 which is supported between the headstock 33 and the tailstock 34 of the lathe 32. The counterweight 88 causes the roller 52 to be biased upwardly as viewed in FIG. 3. It will be recalled that the end portions of the preform rod 24 are held in spindles of the lathe 32 with axes of rotation of the spindles being aligned with each other.

Generally, the operation of the apparatus 22 is such that the platform 68 is caused to be moved upwardly as seen in FIG. 3 to elevate the roller 52. When the roller 52 engages the preform rod 24, the arm 84 is caused to be turned in a counterclockwise direction as viewed in FIG. 3. This causes the second electrical contact 86 to be moved upwardly to engage the depending portion 82 of the first electrical contact 80 and complete an electrical circuit (not shown) which controls the stepper motor. Because of the location of the fulcrum 74 along the arm, a downward movement of the roller 52 of only about 0.005 cm - 0.008 cm will cause the second electrical contact to move upwardly through the 0.018 cm gap and engage the first electrical contact 80.

The electrical contacts 80 and 86 perform a dual function. Not only does their touching each other complete an electrical circuit, but they also cooperate to provide a stop which is effective to discontinue the upward movement of the end portion 85 of the arm 84.

The electrical contacts 80 and 86 are connected to a programmable controller 90 which is connected to the stepper motor. The controller 90 causes the platform 68 to be moved upwardly incrementally, and, responsive to the closing of the electrical contacts for a predetermined time, causes the upward movement to be discontinued.

In a preferred embodiment, the straightening and configuring portion 22 of the apparatus 20 includes facilities for causing the surface that engages the preform rod 24 to have a temperature that is substantially below that of the preform rod. The housing 56 is adapted to hold a coolant such as deionized water which may be supplied by conduits (not shown) within the arm and cradle. The water is applied over the surface of the roller 52 to clean the surface thereof which engages the tube and to prevent the roller from adhering to the preform rod. The water overflows the sideplates and falls into a drain pan below (not shown). Also, the water forms an interface between the roller 52 and the rod which functions as a cushion to prevent damage to the surface of the rod.

In the manufacture of the preform with the apparatus 20, a glass tube is positioned in the lathe 32 with one of its ends in the headstock 33 and with its other end connected by a welded joint (see FIG. 1) to an exhaust tube 97. The exhaust tube 97 is supported in the tailstock 34 of the lathe 32. The substrate tube is rotated as the torch assembly 40 is moved in a plurality of passes in a direction from the headstock 33 to the tailstock. During each pass, doped reactants are moved into the tube from its headstock end while spent gases are exhausted at the tailstock end. For a description of methods and apparatus for exhausting these gases, see U.S. Pat. No. 4,278,459 which issued on Jul. 14, 1981 in the name of F. P. Partus.

Following deposition in a preferred embodiment, the passes of the first half of the collapse mode occur. Then, the wall of the tube is pinched together adjacent to its tailstock end. This prevents the entry of moisture and other contaminants into the tube while it is being collapsed. Then, the remaining passes of the collapse mode occur in the opposite direction.

During the collapse mode, the heating, at a higher temperature than during deposition, occurs as the torch assembly 40 is moved in a number of passes from headstock to tailstock and in the second half of the collapse mode from tailstock to headstock. At the end of each pass during the second half of the collapse mode, the carriage 36 is returned rapidly to the tailstock for the beginning of another cycle.

After the substrate tube has been collapsed into a solid preform rod 24 in the collapse mode, the graphite support roller 52 is caused to be moved upwardly to engage the rotating preform rod 24 adjacent to the tailstock 34 (see FIG. 4) by the programmable controller 90. Its vertical position is a function of the orbit of the cross section of the rod. The roller 52 is pushed partially into the preform rod and displaces softened glass within the moving zone of heat a predetermined distance "d" (see FIG. 2) behind a centerline 101 of the torch assembly 40. If necessary, the roller 52 is effective to force the rod into alignment with the axis of rotation between the headstock 33 and the tailstock 34. Accordingly, the roller 52 is adapted to urge successive increments of length of the preform rod upwardly until each is disposed substantially cocentrically about the axis of rotation between the chucks of the lathe 32. During the straightening and configuring mode, the rotational speed of the preform rod 24 is about 75 rpm.

Parameters which are important to the method of straightening and configuring the preform rod 24 are the carriage speed and the rotational speed of the lathe spindles and the position of the engagement of the contact device 50 with the preform rod 24 relative to the zone of heat. Also important is the temperature of the glass within the zone of heat 41. This is a function of the delivery rates of hydrogen and oxygen to the torch assembly 40. In the preferred embodiment, the delivery of hydrogen to the torch assembly 40 is about 130 liters per minute and the delivery of the oxygen is about 65 liters per minute.

The zone of heat 41 is formed in the vicinity of the torch assembly 40 as the torch passes along the rod, but, as will be recalled, it is usually not centered with respect to the centerline 101 of the torch and trails it (see FIG. 2). Up to a point, the distance, d, by which its maximum temperature lags the torch assembly 40 is a function of the velocity of the torch assembly; the greater the velocity, the greater the trailing distance. Inasmuch as the preform rod 24 has a thickness and the torch assembly 40 is moving along the rod, the zone of heat lags the torch assembly.

The contact device 50 must engage the preform rod 24 at a point where the glass is sufficiently soft so that it can be reconfigured. Also, the arrangement of the torch assembly 40 and the contact device must be such that the glass will take a set after its engagement with the roller 52. The point of engagement must not be at a point where subsequently the glass experiences a higher temperature, which would remove the set.

Inasmuch as the location of the zone of heat is difficult to ascertain, the roller 52 may be referenced to the centerline 101 (see FIG. 2) of the torch assembly 40. The distance "d" between the centerline of the torch assembly 40 and a center axis 105 of the roller 52 is called the trailing distance and occurs where the increment of length of glass is soft enough to be reconfigured without interfering with interior, less soft layers of the preform. Also, the increment engaged by the roller 52 must be cool enough afterwards to retain that reconfiguration as the graphite roller moves on to the next successive increment along the length of the preform rod. In the preferred embodiment, the water which is flowed over the graphite roller 52 provides ideally a moving cold zone which helps to establish a set in the preform rod which is being straightened progressively. In a preferred embodiment, the distance "d" is on the order of 3.5 cm. Should the distance exceed an established range, the glass which is contacted by the roller 52 would be too cool to be successfully reconfigured.

The water cooling of the roller 52 is helpful in preventing the roller from adhering to the glass tube. Also, the water is effective to flush any ablations caused by the flames from the tube. Otherwise, these could cause dust particle accumulations which could become deposited on the graphite roller and be impressed into the glass by the roller resulting in stress points in the preform rod and subsequent low strength fiber.

The manner of engagement and disengagement of the force-applying means, the roller 52, with the preform rod 24 is important to the successful straightening and reconfiguration of the preform rod. As can be seen in FIG. 4 of the drawings, the roller 52 is moved to a first jog stage 107 as the carriage 36 is moving along the lathe bed at a velocity in the range of about 8 to 10 cm/minute. During this period of adjustment, the preform rod 24 in the lathe is being caused to be turned at a rotational velocity of about 75 rpm. Another manner of stating the rotational velocity and one which will be more meaningful to an understanding of the invention is that the preform rod 24 is turned through about 0.5 revolution in 0.4 second.

The first jog stage 107 in FIG. 4 is reached very rapidly by the roller 52. It is caused to be reached by controlling the stepper motor 64 through the programmable controller 90 to move the platform 68 upwardly toward the axis of rotation of the preform rod until it reaches a position which is designated "X" and which is always spaced from the axis of rotation of the preform rod beyond the largest expected orbit of any preform rod. The methods of this invention cause the reconfigured preform rod 24 to have a cross section which in area is substantially equal to the cross section before reconfiguring and which is substantially circular. Also, as stated hereinbefore, the longitudinal axis 100 of the reconfigured preform should be substantially straight with the cross section disposed concentrically about the axis.

The stepper motor 64 is controlled to move the roller 52 upwardly first in a gross mode which is the first jog stage 107 and then in a fine tuning mode which is a second jog stage designated 109. In a normal fine tuning mode, the stepper motor 64 is controlled to cause the roller to be moved upwardly in steps of about 0.0036 cm, each. However, during the gross mode, a multiplier is used to cause each upward step to be about 0.0108 cm. The gross mode is used to cause the roller 52 to move rapidly from the reference position, "X", into initial engagement with the preform rod 24. Initially, the preform rod 24 occupies the position shown in solid lines in FIG. 4 and orbits about the axis of rotation 35 as shown in FIG. 5. Desirably, the point of initial engagement with the preform rod is just to one side of the pinch-off area (see FIG. 4). As can be seen in FIG. 5, the preform rod 24 has a slight offset which causes it to orbit slightly as the preform rod is turned rotatably.

After the initial engagement of the roller 52 with the preform rod and while the preform rod is orbiting slightly (see FIG. 5), the roller is moved upwardly in 0.0036 cm steps during the fine tuning mode. The incremental steps upwardly are made approximately in 0.1 to 0.2 second intervals.

During the fine tuning mode, there occurs what is referred to as a 0.4 second search. After the initial engagement of the roller 52 with the preform rod, the roller is caused to be moved into the preform rod a distance of about 0.005 to 0.008 cm. As a result, the electrical contact 86 is caused to be moved through the 0.0018 cm gap and engage the first electrical contact 80. When the roller 52 has been engaged with the preform rod 24 continuously for 0.4 second, which corresponds to about one-half of a complete 360° rotation of the preform rod, it is assumed that the cross section is circular at that location and that the axis is substantially straight and in line with the centerline axis of rotation 35 extending through the headstock 33 and the tailstock 34 of the lathe 32. This engagement has taken place while the carriage 36 is being moved in a direction along the preform rod at the rate of about 9.6 cm/min. Approximately twenty times a second, the controller 90 looks for the satisfaction of the 0.4 second search.

At this time, several alternatives are available. In one, the roller 52 is caused to remain at its present level relative to the axis of rotation 35 and no further adjustments are made. A variation of this would allow the roller 52 to be moved upwardly to reengage the preform rod 24 should disengagement occur as the roller traverses the rod. In the vast majority of times, either results in an acceptable preform rod. However, if for some reason, the point of initial engagement of the roller with the preform rod 24 is further toward the left, as seen in FIG. 4, in the necked-down area, the roller at a fixed spacing relative to the axis of rotation may be moved against an increasingly large mass of glass which could result in damage to the glass.

In the preferred embodiment, there is a constant cycling of the making and breaking of the electrical contacts 80 and 86. After the 0.4 second search has been satisfied, there is a pause for about 5.0 seconds during which time the carriage 36 has advanced about 0.8 cm. After 5 seconds have elapsed, the platform 68 is moved downwardly to cause the roller 52 to discontinue its engagement with the preform rod and the 0.4 second search condition is not satisfied. Also, the electrical contact 86 becomes disengaged from the electrical contact 80. Immediately thereafter and as the carriage 36 is being moved in a direction along the preform rod 24, the roller 52 again is moved upwardly to restart another cycle which includes a 0.4 second search. In other words, after each 0.4 second engagement of the roller 52 with the preform rod, the stepper motor 64 is controlled to cause the roller to become disengaged from the preform and so that the 0.4 second window condition is not continuously satisfied. When that occurs, the stepper motor 64 is controlled to cause the platform 68 and hence the roller 52 to be moved upwardly as the carriage is advanced along the preform rod until the 0.4 second window condition again is satisfied. As a result, the configuration of the preform rod is monitored and adjusted continuously.

A further refinement may be used. If, in each 5 second window of time during which the roller 52 is held at a constant distance from the axis 35, the roller becomes disengaged from the preform rod because of residual orbiting, for example, then the controller 90 causes the roller again to be moved upwardly to engage the rod.

What is important is that as the roller 52 engages the preform rod, it causes the orbit of the rod to become smaller and smaller iteratively until there is none. In a preferred embodiment, two reconfiguring passes are used. At that time, the preform rod has the sought after geometrical characteristics and the longitudinal axis 100 of the preform rod is substantially coincident with the axis of rotation 35 (see phantom line position in FIGS. 4 and 5).

Viewing now FIGS. 6 and 7, there is shown a substrate rod 24 which has a more pronounced offset. The preform rod 24 in its initial configuration in FIG. 6 is shown in solid lines. Again, the roller 52 is caused to be moved upwardly in a gross mode 107 from a position "X" to engage the rod. However, because of the offset, the fine tuning mode 109 may require substantially more 0.0036 cm upward jogs until the 0.4 second window search is satisfied. This is due to the increased orbiting of the cross section of the rod causing the position of the roller to be farther spaced from the centerline of the spindles than before (see orbiting rod shown in solid in FIGS. 6 and 7).

Also as seen in FIGS. 8 and 9, the preform rod 24 may have an even more severe offset which causes an enlarged orbit. In such an instance, the fine tuning mode 109 requires even more jogs until the 0.4 window is satisfied which denotes that the rod is straightened at that location. Reference may be made to FIGS. 9A, 9B and 9C which show the position of the roller 52 with respect to the preform rod 24 at several positions along the length. As can be seen by comparing FIGS. 9A and 9B, the orbiting has decreased and at the location where FIG. 9C is taken there is none. After reconfiguring, the preform rod 24, as shown by the central phantom line position in FIG. 8 has its longitudinal axis substantially coincident with the axis of rotation 35. In FIG. 10, the position of the roller 52 with respect to an offset portion of the preform rod is shown. As the roller 52 is moved to the right, the roller causes the rod to be straightened and to have a circular cross-sectional configuration.

In FIGS. 11 and 12, there are shown views of an out-of-round preform rod 24 and its reconfiguring with a force-applying means such as the roller 52. As is seen in FIG. 11, the preform rod is somewhat oval-shaped so that as it is rotated, it becomes disengaged with the roller 52 along a lower portion of its periphery. This disengagement causes the controller 90 to cause the platform to be moved upwardly until the roller 52 and preform rod 24 again engage each other.

After it has been caused to be straightened by the apparatus 20, the preform rod 24 is now ready for use in preparing a preform from which optical fiber is drawn. As is seen in FIG. 13, the reconfigured preform rod 24 is inserted into an overcladding tube 120 whereafter the tube is caused to be collapsed onto the rod. Subsequently, optical fiber is drawn from the overcladded rod in accordance with well known methods.

It is to be understood that the above-described arrangements are simply illustrative of the invention. Other arrangements may be devised by those skilled in the art which will embody the principles of the invention and fall within the spirit and scope thereof.

What is claimed:

1. A method of straightening optical glass substrates from which optical fiber is to be drawn, the method being effective notwithstanding differing diameters among successive substrates to be straightened by said method, said method including the steps of:

supporting end portions of an elongated optical glass, substantially circular substrate so that said substrate is capable of rotation about an axis of rotation which extends through the end portions thereof;

causing the substrate to be turned rotatably about the axis of rotation, the rotating of a substrate which is not substantially straight causing portions of the substrate to be at a greater radial distance from the axis of rotation than are other portions of the substrate;

moving a force-applying contact means which will subsequently engage the substrate and which is effective to straighten the substrate for causing the substrate to be disposed concentrically about the axis of rotation, said movement being in a forward direction parallel to the axis of rotation; while heating successive increments of length of the substrate in a manner to cause the substrate to be capable of being straightened by the force-applying means by causing the temperature of the increments of the substrate to be sufficiently high to allow straightening of each increment of the substrate upon continuous engagement of the force-applying means with the periphery of said each increment of the substrate while rotating for a predetermined time which will insure circularity of each said increment, causing the force-applying means to be moved continuously inwardly toward the axis of rotation to a reference point spaced outside the largest expected radial distance which distance is measured from the axis of rotation to an outer surface of the substrate and then to be moved, in a first mode of contact, in incremental steps of forward and then inward movement toward the axis of rotation until a portion of the substrate and the force-applying means engage each other along a portion of the circumference;

as the rotation of said substrate causes a portion of said substrate which is at a lesser distance from the axis of rotation than a preceding adjacent portion of the substrate to move away from said force applying contact means, causing the force-applying means to be moved further gradually and incrementally forward and inward in a second mode of contact toward the axis of rotation in incremental steps which are substantially less than the steps of the first mode until the force-applying means has remained in continuous engagement with a predetermined portion of the periphery of an increment of length of the rotating substrate which is sufficient to insure that the increment of length of the substrate is disposed concentrically about the axis of rotation; and cooling the force-applying means to establish a setting of the glass of the successive increments of length of the substrate after said successive increments of length have been straightened;

wherein said force-applying contact means comprises a member having a solid portion of said member in physical contact with said substrate to effect the engaging of the substrate.

2. A method of causing an elongated optical glass substrate in the form of an elongated glass preform rod to have a substantially straight longitudinal axis and to have a transverse cross section along its length which is substantially circular and which cross section is disposed concentrically about the longitudinal axis, said method including performing the steps of the method of claim 1, and wherein a cycle of operation comprises the steps of causing the force-applying means to be moved incrementally and holding said force-applying means in engagement with the preform rod for a predetermined time after which the force-applying means is caused to become disengaged from the preform rod, and further wherein the force-applying means is caused to be moved forward and inward toward the axis of rotation of the preform rod at each of a plurality of locations along the preform rod, the cyclical operation at each of the plurality of locations along the preform rod being sufficient to cause the preform rod to have a substantially straight longitudinal axis substantially coincident with the axis of rotation and a transverse cross section which is substantially circular and disposed concentrically about the longitudinal axis.

3. The method of claim 2, wherein the force-applying means is capable of movement in a direction away from the axis of rotation as a result of sufficient engagement with the preform rod where the engagement of the preform rod with the force-applying means is such that the force-applying means is caused to be moved a predetermined distance in a direction away from the axis of rotation.

4. The method of claim 3, wherein after the force-applying means has been disengaged from the preform rod at one location after a predetermined time, another cycle of operation is begun and the force applying means is caused to be moved forward and inward toward the axis of rotation of the preform rod until a portion of the preform rod and of the force-applying means again engage each other at another location along the preform rod.

5. The method of claim 4, wherein when there is an indication of disengagement of the force-applying means and the preform rod, the force-applying means is caused to be moved in incremental steps forward and inward in the first mode of contact and then in incremental steps of the second mode of contact forward and inward toward the axis of rotation until there is an indication of engagement of the force-applying means and the preform rod for a predetermined time after which the force-applying means is held at a constant distance from the axis of rotation for a predetermined time.

6. A method of causing an elongated optical glass substrate in the form of an elongated glass preform rod to have a substantially straight longitudinal axis and to have a transverse cross section along its length which is substantially circular and which cross section is disposed concentrically about the longitudinal axis, said method including the steps of the method of claim 1, and wherein after said force-applying means has been in continuous engagement with the preform rod for a predetermined portion of its periphery at an initial position, the force-applying means is held at a constant spacing from the axis of rotation until the force-applying means has been moved the length of the preform rod to cause the preform rod to have a substantially straight longitudinal axis substantially coincident with the axis of rotation and a transverse cross section which is circular and disposed concentrically about the longitudinal axis.

7. A method of making optical fiber, said method comprising the steps of providing an optical preform rod in a method which includes the steps of claim 1, then drawing optical fiber from the preform rod and taking up the optical fiber.

* * * * *